United States Patent

[11] 3,602,725

| [72] | Inventor | Anthony J. DeMaria<br>West Hartford, Conn. |
|---|---|---|
| [21] | Appl. No. | 871,554 |
| [22] | Filed | Nov. 12, 1969 |
| [45] | Patented | Aug. 31, 1971 |
| [73] | Assignee | United Aircraft Corporation<br>East Hartford, Conn. |

[54] VARIABLE ACOUSTIC LASER DELAY LINE
6 Claims, 13 Drawing Figs.

[52] U.S. Cl. .................................................. 307/88.3,
350/161
[51] Int. Cl. ..................................................... H03f 7/00
[50] Field of Search .......................................... 307/88.3;
331/94.5; 350/161

[56] References Cited
OTHER REFERENCES
Adler, " IEEE Spectrum," May 1967, pp. 42–54
Siegman et al., " Applied Physics Letters," July 1, 1964, pp. 1– 2 307-88.3

Primary Examiner—Roy Lake
Assistant Examiner—Darwin R. Hostetter
Attorney—Donald F. Bradley ABSTRACT: A delay apparatus comprising means for generating a laser beam including a laser medium having a pair of end reflectors to form a feedback cavity, at least one of said reflectors being spaced from said laser medium, an acoustic transmitting medium positioned between said laser medium and said spaced reflector, means responsive to an alternating input signal for generating an acoustic wave within said acoustic medium, said acoustic wave propagating within said acoustic medium and intersecting said laser feedback radiation whereby said laser radiation is diffracted and produces at least one frequency shifted component together with an undiffracted component, a reflecting mirror positioned in the path of one of said frequency shifted components for reflecting said frequency shifted component back through said acoustic medium to reintersect said acoustic wave where said frequency shifted component is further diffracted producing a further frequency shifted component which is inserted into said feedback cavity, and means for producing from at least one of said frequency-shifted components an output signal having a frequency which contains any desired odd or even integral multiple of said alternating input signal frequency.

INVENTOR
ANTHONY J. DEMARIA
BY Donald J. Bradley
ATTORNEY

VARIABLE ACOUSTIC LASER DELAY LINE

This invention relates to improved delay elements for electrical signals, and particularly to systems and apparatus in which a laser output is modulated or varied by elastic or acoustic disturbances to produce a continuously variable delay of electrical signals.

In another embodiment this invention relates to optical-acoustic interaction to regulate or shape the output pulses of a laser.

There are many applications where it is desired to delay an electromagnetic signal in the radio frequency and microwave regions of the electromagnetic spectrum. Since the velocities of elastic waves in solids are about 100,000 times slower than electromagnetic waves in free space, reasonable delays can be conveniently obtained in a small space if the electrical signal is converted to an acoustic wave, propagated through a medium, and then converted back to an electrical signal at a later time which may be determined by the ratio of length to acoustic velocity in the medium. Video delay lines of fixed length are presently commercially available and adequately fulfill most needs in the RF region. Delay lines with similar features are not presently available in the microwave region. However, adequate variable delay lines are not available in either the RF or microwave regions.

It is known that the output of a laser can be modulated by the propagation of acoustic energy in the optical feedback path of the laser. See for example my copending application Ser. No. 228,969 entitled "Ultrasonic Control of Lasers" filed Oct. 8, 1962, now abandoned and assigned to the same assignee. It is also known that variable delay of an electrical signal can be obtained by converting the electrical signal to an acoustic wave, allowing the acoustic wave to modulate the optical feedback path of the laser, and detecting the amplitude modulation of the laser's output with a photodetector, thereby reproducing the original electrical signal. The time taken for the acoustic wave to intercept the laser's feedback path constitutes the desired time delay. A continuous variation of the time taken for the acoustic wave to intercept the laser's feedback path can be obtained by either mechanically sliding the acoustic medium into or out of the laser's feedback path, or by scanning the light beam across the acoustic medium with an electro-optical or mechanical scanner.

The basic concepts of laser-acoustic interactions to obtain a variable delay of an electrical signal are disclosed and claimed in my copending application Ser. No. 364,395 entitled "Variable Laser Ultrasonic Delay Line" filed May 4, 1964 now abandoned, and assigned to the same assignee. However, the apparatus disclosed in this prior application requires the use of polarized light and a narrow slit whose width is approximately one-half a sound wavelength. This requirement sets an upper limit to the operating frequency of the apparatus, since a 5-mc./sec. acoustic wave in fused quartz would require a slit width of approximately 0.5 mm.

The present invention discloses systems and apparatus for obtaining a continuous variable delay without the need for a narrow slit, thereby enabling the ultrasonic laser delay line to operate in the microwave region.

In another aspect this invention relates to laser pulse shaping with acoustic waves, and specifically to the utilization of a periodic perturbation of the refractive index in part of a laser feedback path to pulse shape the output of a laser device. The refractive index perturbations are generated by propagating an RF elastic wave through part of the laser's Fabry-Perot cavity. In addition, the elastic waves may also be utilized to mode lock the output of a laser for the construction of a variable delay line.

A principal asset of the delay techniques disclosed herein is their capability of providing coherent memory with a continuously variable memory time of signals in the $10^7$ to $10^9$ c.p.s. range with reasonable bandwidths. Multiple output delay taps may also be provided with a continuous delay variation of each individual tap.

The coherent memory feature of the delay system and apparatus disclosed herein has extensive application in the field of information processing, radar systems, computers and many other fields.

It is therefore an object of this invention to provide a system and apparatus for producing a variable delay of an electrical signal.

Another object of this invention is the use of acoustic waves to modulate the optical feedback path of a laser to provide a variable delay of an electrical signal.

A further object of this invention is a system and apparatus for providing a continuously variable delay of an electrical signal in the RF to microwave frequency ranges.

A still further object of this invention is to provide pulse shaping of a laser output with acoustic waves.

Another object of this invention is the utilization of elastic waves to mode lock a laser's output for a variable delay line.

These and other objects and a more complete understanding of the invention may be had by referring to the following description and claims, read in conjunction with the accompanying drawings, in which;

It is well known that light is diffracted by the density variation of a medium arising from the compressions and rarefactions produced by acoustic waves. Normal or Raman-Nath-type diffraction of a plane parallel light beam is produced by acoustic waves whose wavelengths are much smaller than the light beam diameter. Abnormal or Bragg-type diffraction is also known to occur under certain conditions.

For the case of traveling sound waves, the sound waves which act as a diffraction grating are moving with the velocity of sound at right angles to the direction of the light. As a consequence of the resulting Doppler effect, the light beam of the diffraction spectra which is bent in the direction of sound propagation experiences an increase in frequency, while the light beam which is diffracted in the opposite direction is lowered in frequency by an equal amount. It can be shown that the Doppler frequency shift in any order is a multiple of the acoustic frequency. This frequency shift which occurs in the diffracted orders of the light beam may be used as the basis for a variable acoustic laser delay line as will be subsequently described.

In addition to the utilization of the diffraction effect caused by laser-acoustic interaction to obtain a continuous variable delay of an electrical signal, this diffraction effect can also be utilized to pulse shape the output radiation of a laser device. The effect of elastic waves and the use of such elastic waves to pulse shape and mode lock the output of a laser for the construction of a variable delay line will be described.

Figure 1:
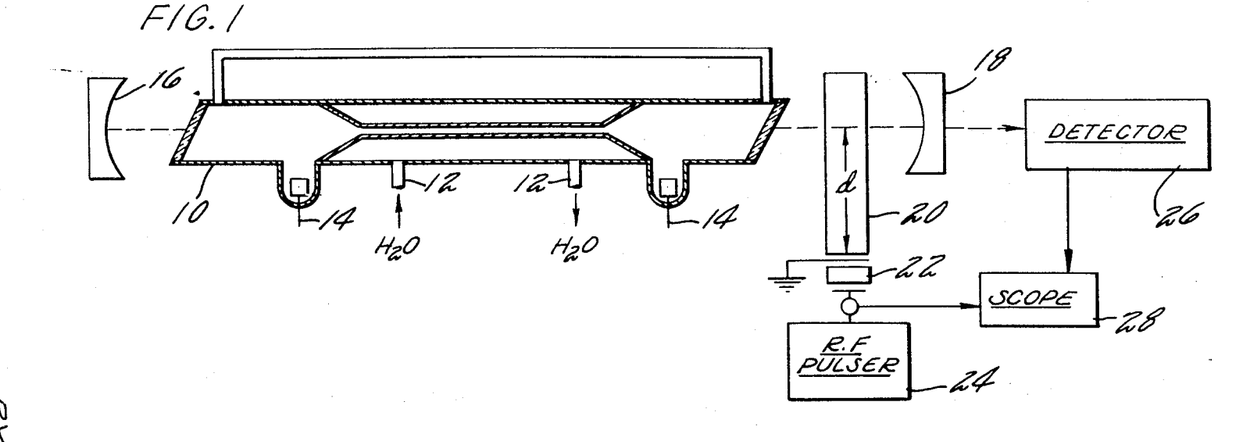
FIG. 1 shows a typical laser configuration in which the laser output is varied by an ultrasonic wave.

FIG. 1 illustrates one embodiment of a laser configuration in which an argon ion laser 10 is water-cooled through ports 12 and excited by a 350 volt DC source between electrodes 14. Other types of lasers may be used. Two external reflectors 16 and 18 with reflectivities of 99 percent and 88 percent respectively form the optical feedback cavity. An element 20 which may be optical grade fused quartz, glass, rutile, etc., is inserted into the laser's feedback cavity as shown to be utilized as an acoustic medium. A transducer 22 such as a quartz crystal energized by an RF pulser 24 generates acoustic pulses in the frequency range of $10^6$ to $10^{10}$ c.p.s., i.e. from radio frequency to microwave within the element 20. A detector 26 such as a photomultiplier is positioned as shown to detect the output from the laser, and the detector and pulse source 24 may be connected to a scope 28 if observation of the initial and delayed signal are desired. The output of the detector constitutes the output of the device and may be utilized for a number of purposes known to those skilled in the art.

The distance ($d$) from the transducer to the laser optical feedback path determines the time delay from the initiation of an acoustic pulse to the interaction of the acoustic pulse with the laser's optical feedback path.

Figure 2A:
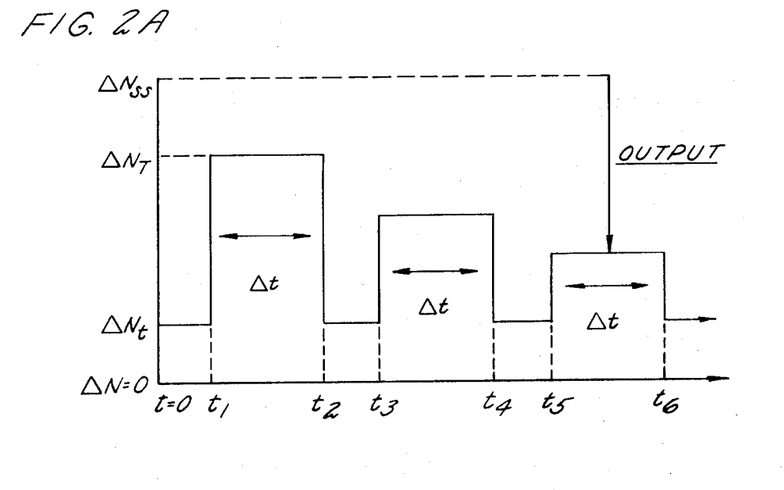
FIGS. 2a and 2b are graphs showing typical variations of laser threshold population as a function of traveling and standing wave refractive index perturbations.

FIG. 2a shows the typical variation of laser threshold population as a function of a traveling wave generated in the quartz medium 20 by transducer 22. If $\Delta N_{ss}$ equals the steady-state population difference in the upper of any two laser energy states under zero positive feedback conditions, and $\Delta N_t$ equals the threshold population required for self-sustained oscillation under normal positive feedback conditions, the output energy is then given as a function of $\Delta N_{ss} - \Delta N_t$. $\Delta N_{ss}$ is determined by the transition rates of the various energy states of the particular laser medium and by the input pumping energy. $\Delta N_t$ is a function of the reflectivity of the mirrors, their separation distance, and the cross section for the laser quantum transition.

If at time $t=0$, pulser 24 actuates transducer 22 to generate an acoustic wave the quartz medium 20 with a velocity $v$, the compressions and rarefactions of the pressure wave will alter the density of the medium and thereby generate a periodic refractive index perturbation within the quartz medium. If the ratio of the light beam width W to acoustic wavelength $\Lambda$ is $W/\Lambda >> 1$, the perturbation resembles a moving diffraction grating. After traveling a distance ($d$), the perturbation intercepts the optical feedback path of the laser at time $t_1 = d/r$, and increases the required threshold population $\Delta N_t$ to $\Delta N_T$ by scattering light out of the cavity. The output energy is now given by $\Delta N_{ss} - \Delta N_T$ and is therefore reduced.

The dependence of the intensity of the primary and scattered secondary laser beams depends on the acoustic power input. The secondary beam is frequency shifted by an amount equal to the acoustic frequency. In this manner separate but coherently related output beams from a single laser at each of three different frequencies, primary and two secondaries, are available. In particular, the relative intensities of the primary and secondary beams can be controlled by varying the acoustic power. With this technique, nearly full intensity can be obtained in either of the output secondary beams. Since the frequency translation occurs in the output coupling process, the frequency is not restricted by either the laser cavity bandwidth or the atomic linewidth.

If it is assumed that the time duration of the perturbation is $\Delta t$, then at time $t_2 = t_1 + \Delta t$, the perturbation has passed through the laser's optical feedback path and the threshold population requirements revert back to $\Delta N_t$ with a corresponding increase in laser output. If the acoustic wave is reflected at the end of the acoustic medium, the perturbation again intercepts the optical feedback path of the laser at a time $t_3$ and the process is again repeated. Since the acoustic wave will suffer some attenuation per unit length of travel in the medium, the output fluctuation of the laser caused by the acoustic wave will be exponentially damped with time.

Figure 2B:
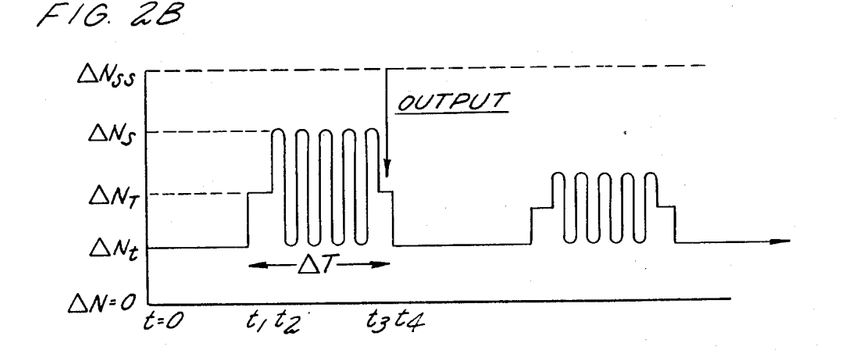

If it is assumed that the optical feedback path of the laser intercepts the perturbation medium 20 near the end opposite the transducer 22, and at time $t_0$ an elastic disturbance of time duration $\Delta t$ is again launched, the disturbance will intercept the laser's feedback path at time $t_1$, thereby decreasing its output energy as previously described. If it is now assumed that the perturbation is reflected at the end of the acoustic medium so that at time $t_2$ the outgoing and returning waves simultaneously intercept the laser's optical path, and if $\Delta t$ represents the time duration of the initial pulse and $\Delta T$ the time duration of the laser pulse, then for $T = 2\Delta t - \Delta T$ seconds, $t$ standing-wave-refractive index perturbation exists. The constructive and destructive interference resulting from the two oppositely traveling waves effectively causes the perturbation to appear and disappear at twice the perturbation frequency. The appearance and disappearance of the perturbation causes the required threshold population to oscillate from a low of $\Delta N_t$ to a high of $\Delta N_s \approx 2\Delta N_T$ at twice the acoustic frequency as shown in FIG. 2b. The oscillation of the required threshold population at twice the acoustic frequency causes the laser to be amplitude modulated at twice the acoustic frequency. This process again repeats itself many times if the acoustic pulse is allowed to echo back and forth between the ends of the acoustic medium 20.

Figure 3A:
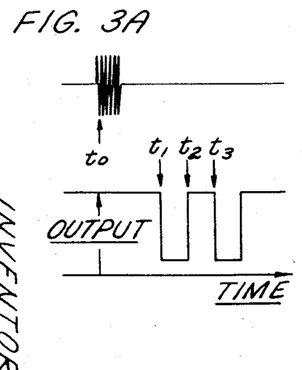
FIGS. 3a, 3b and 3c show laser output variations with acoustic wave perturbations in the feedback cavity of the laser.
Figure 3B:
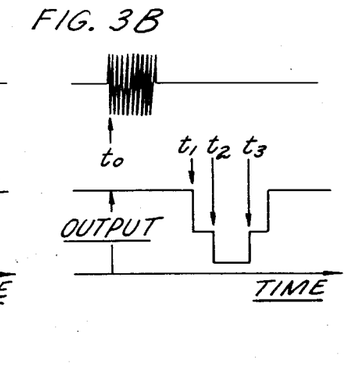
Figure 3C:
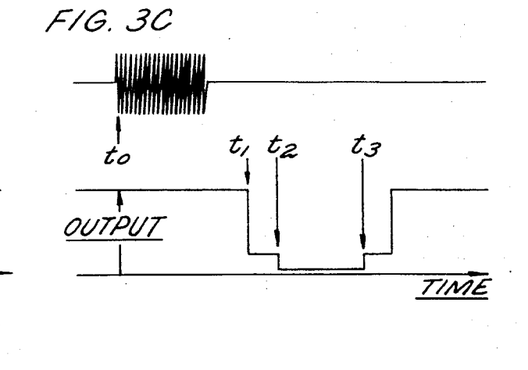
Figure 4:
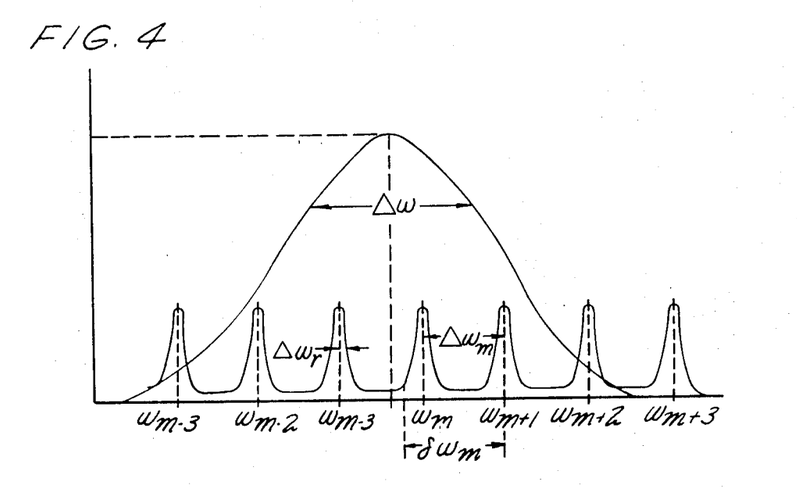
FIG. 4 shows the atomic line frequencies and bandwidth of a laser.

Oscilloscope traces obtained in a typical experiment of the variation of the laser's output as a function of the periodic refractive index perturbation pulse generated by a 27-mc./sec. acoustic wave of 5.5 $\mu$sec. time duration are shown in FIG. 3. The output behavior of the laser when subjected to a traveling wave perturbation and the outward and returning pulses is clearly evident, in FIG. 3a. The higher peak of the stepped-shape pulse shown in FIG. 3b represents the time interval during which a standing wave perturbation exists. In FIG. 3c, the ratio of the height of the stepped-shape waveforms of the laser's output can be adjusted by varying the amplitude of the perturbation.

Attempts to detect the internal modulation of the laser beam's output with the arrangement shown in FIG. 1 at 54-mc./sec. were unsuccessful. The reason is that a $2.2 \times 10^{16}$ sec. recovery time is required for the laser to make a transition from an "off" to an "on" condition, whereas at 54-mc./sec. the period is approximately $1.8 \times 10^{17}$ sec. or two orders of magnitude faster than the recovery time of the laser. Decreasing the discharge current supplied to the plasma produces an increase in laser recovery time because of the effective decrease in the gain of the laser by decreasing the rate at which excited atoms are supplied to the upper laser level.

A method for overcoming the slow recovery time of the laser is to internally modulate the laser at a frequency commensurate with the adjacent axial mode spacing frequency.

Laser oscillators generally consist of a resonant system with dimensions that are large when compared to the oscillating wavelength. Consequently, mode density is high and there are a number of resonances within the linewidth of the laser material.

It is known that when a laser is internally modulated at a frequency equal to some multiple of the axial resonant mode spacing, all axial modes of the Fabry-Perot cavity couple with a well-defined amplitude and phase. The coupling of the amplitude and phase of the axial modes results from the superposition of the upper and lower sidebands of the modulated light beam with the resonance of the Fabry-Perot interferometer. The axial mode nearest the center of the spectral line has the highest gain and, therefore, is the first to start to oscillate. If this mode is modulated at a frequency such that the sidebands of the amplitude modulated spectrum fall within the bandwidth of an adjacent axial mode resonance, the adjacent resonant mode is locked in phase with the first mode. This process repeats itself throughout the bandwidth of the laser medium. Simultaneous phase-locked oscillations at integer multiple frequencies are equivalent to reducing a repetitive pulse train into its Fourier components. As a result, the constructive and destructive interference of the simultaneous phase locked oscillations of the axial modes of a laser yields a pulsating output at twice the acoustic standing wave driving frequency.

The above theory was experimentally proven by bonding a 52-mc./sec. transducer to the end of the fused quartz block 20 in an experimental arrangement similar to FIG. 1. A 104- mc./sec. modulation of the laser's output was observed when the outwardgoing wave and the echo wave passed each other.

The results of these and similar experiments show that the mode locking of lasers by acoustic waves offers a solution to the problem of obtaining a variable delay of an electrical signal. If the electrical signal is converted to an acoustic wave as described previously, and the periodic refractive index perturbation generated by the acoustic wave is allowed to modulate the optical feedback path of the laser, the original electrical signal can be reproduced by detecting the amplitude modulated output of the laser with a photodetector. The time taken for the elastic wave to intercept the laser's feedback path will constitute the desired time delay. The delay of such a quantum-acoustical device can be varied by mechanically changing the distance between the acoustic transducer and the feedback path of the laser.

Another experimental technique similar to FIG. 1 may be used to overcome the slow recovery time of a laser. The only difference between this experiment and that of FIG. 1 is that the photodetector is positioned to sense one of the secondary outputs of the laser rather than the primary output. The laser's Fabry-Perot interferometer is utilized as an optical energy source. The internal modulation is utilized to couple out of the laser's feedback cavity energy over a wide frequency range. The modulation is detected on the secondary laser output beam which is internally scattered out of the laser's feedback by the periodic refractive index perturbation generated by a standing acoustic wave. The constructive and destructive interferences resulting from the two oppositely traveling waves composing the standing wave effectively cause the perturbation and hence the secondary light beam to appear and disappear at twice the acoustic frequency. Since the modulation of the secondary beam occurs as a coupling out process, the modulating frequency is not restricted by either the laser cavity resonance bandwidth, atomic linewidth, etc.

The bandwidth of the resonance of a laser's Fabry-Perot feedback interferometer at the half-intensity points is directly proportional to the reflectivity of the mirrors and the velocity of light, and inversely proportional to the separation between the mirrors. If it is attempted to modulate a laser at a frequency such that the sidebands of the amplitude modulated light fall outside the bandpass of the Fabry-Perot resonance, the sidebands cannot exist in the feedback interferometer. Since amplitude modulation cannot occur without the existence of upper and lower sidebands, the output of the laser will not be modulated. If the laser is internally modulated by the acoustic waves at a frequency such that the sidebands fall within the passband of the feedback interferometer, the laser will be modulated and can thus be used as a variable delay line. One disadvantage of this internal modulation method is that the bandwidth of the interferometer resonance is small and will thus yield a variable delay with a small bandwidth.

In addition, a low frequency signal is generated from the beating of the sidebands of the internally amplitude modulated laser beam with the oscillating axial modes of the interferometer. The conditions under which these low frequency beats occur can be determined mathematically. The amplification of the amplitude modulated sidebands as they propagate through the laser medium enable these low frequency signals to be of rather large amplitude.

Another way of stating the internal modulation problem is that if the decay time of the radiation stored within the laser is longer than the period of the amplitude modulating signal, the Fabry-Perot interferometer acts as an optical ripple filter and smooths out the amplitude modulation.

If the modulation frequency is less than the critical value, then the sidebands can exit the cavity and internal amplitude modulation of the laser is obtained. The variable delay feature can be obtained by varying the parameter "$d$," i.e., by moving the quartz element 20 in FIG. 1, by mechanical motion or by nonmechanical deflection of the light beam by an electrooptical component. This modulation is obtained with standing acoustic waves.

If the modulating frequency is larger than the critical value, other techniques must be used to realize a variable delay by means of laser acoustic interactions. A solution to this problem is to use the laser's Fabry-Perot interferometer as an optical energy source. Amplitude modulation over a wide frequency range is obtained by coupling out part of this energy at any desired frequency.

Another alternative is the mode locking technique described previously. When mode locking is used, the sidebands of the internal amplitude modulation of the $m^{th}$ axial mode falls within the passband of the $m+1$ axial mode and thus exits the laser cavity. A disadvantage of this technique results from the presence of a background signal resulting from beating of adjacent axial modes of the interferometer. In addition, a large amount of distortion resulting from the large harmonic content of the pulses also exists under a mode locked condition which is also objectionable in some cases.

Figure 5:
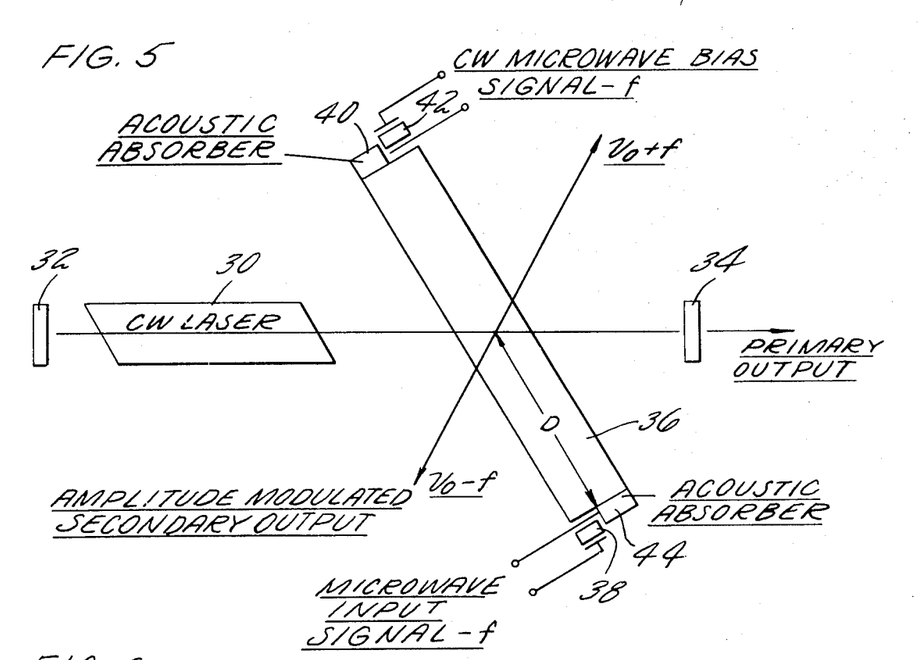
FIG. 5 shows schematically a laser-acoustic variable delay line using an acoustic biasing signal.

For some applications the linear decrease of output pulse width with increasing delay as previously described when the outward going and returning echo pulses are utilized to form an acoustic standing wave is not useful. This problem can be overcome by providing a continuous wave (CW) acoustic traveling wave as shown in FIG. 5. A continuous wave laser medium 30 such as $Nd^{3+}$ doped YAlG, $Ar^+$, or helium-neon is inserted in a feedback cavity between mirrors 32 and 34. The required pumping apparatus and power supplies for operating the laser are not shown. An acoustic medium 36 is inserted into the laser's feedback cavity as illustrated. A microwave input signal of frequency $f$ is applied to a transducer 38 attached to a portion of one end of the acoustic medium. Transducer 38 is used as the signal transducer. An acoustic absorber 40 is positioned at the opposite end of the acoustic medium.

A CW microwave bias signal of frequency $f$ is applied to a transducer 42 bonded onto the end of the acoustic medium 36 opposite that of transducer 38. A second acoustic absorber 44 is attached to the medium 36 opposite transducer 42. The input signal supplies a traveling acoustic wave through the acoustic delay medium 36 for the purpose of setting up a fixed amount of loss in the optical feedback path of the laser. This loss reduces the output intensity of the laser beam as a function of the acoustic power. In essence the traveling wave is used as a variable attenuator or amplitude bias. For the high acoustic frequency region, the acoustic medium is positioned at the Bragg angle with respect to the acoustic wave in order to maximize the sensitivity of the laser's output with the amplitude variation of the acoustic wave.

If a bias signal is applied to the input signal transducer 42, an acoustic standing wave will be initiated when the bias wave and the signal traveling in opposite directions pass each other. The standing wave ratio of the reluctant wave will depend on the amplitude of the two waves. If the two waves are of equal amplitude, the acoustic diffraction grating will effectively appear and disappear twice each cycle as a result of the constructive and destructive effect of the two oppositely traveling waves. The output intensity of the laser will thus be amplitude modulated at twice the signal frequency. The time taken for the acoustic signal to intercept the optical feedback path of the laser constitutes the desired time delay. The variation of the distance "D" by any known means will yield a variation in the time delay. The intensity of the output signal is reduced because of the generation of the two secondary beams which are amplitude modulated secondary outputs, one of which has a frequency equal to the laser frequency plus the bias signal frequency, and the other of which has a frequency equal to the laser frequency minus the input signal frequency. The frequency of the bias wave and the original wave may have any value in the low radio frequency to microwave range in this and all other embodiments taught in this specification.

When the CW bias signal generated by transducer 42 exists alone, diffraction results and energy is coupled out of the optical feedback cavity and a decrease in the output of the laser is obtained. When a pulsed signal from transducer 38 is propagated along side but in the opposite direction to the CW bias acoustic waves, moments will occur at any fixed point in the acoustic medium where the signal will either cancel or reinforce the optical effect of the bias signal. When optical cancellation occurs, diffraction disappears which results in an increase in the laser's output. When optical reinforcement occurs, diffraction appears and an increase in energy coupled out of the laser's feedback cavity occurs which results in a decrease in the laser's output.

This device can also be used to perform various mathematical manipulations of two electrical signals as a result of the dependence on the output on two input signals. If the frequency of the bias and the signal wave differ by $\Delta f$, the output of the laser will be amplitude modulated at the frequency $\Delta f$.

In some applications, the generation of acoustic standing waves as in FIG. 5 may not be desirable or practical. In the cases where acoustic standing waves are objectionable, acoustic traveling waves may be used to produce a delay line.

Figures 6, 7:
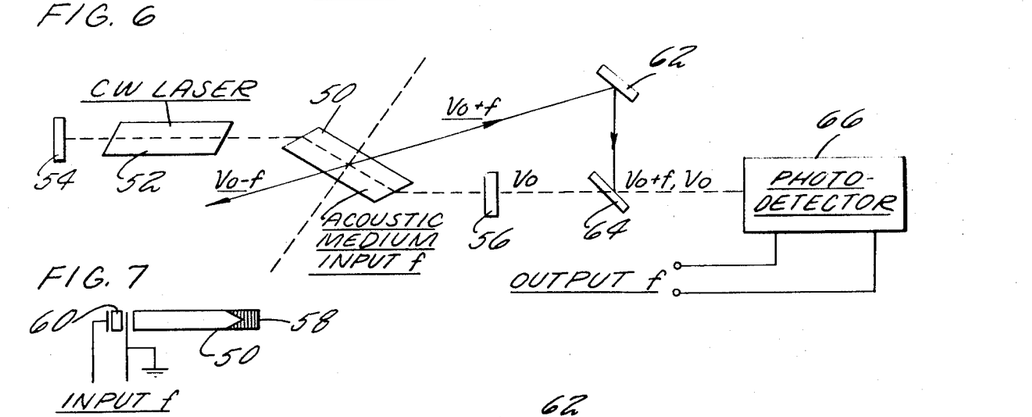
FIG. 6 shows schematically one embodiment of a laser delay line.
FIG. 7 shows the acoustic medium of FIG. 6.

In FIG. 6 a fused quartz bar or other acoustic medium 50 is inserted into the optical feedback path of a continuous wave laser 52, the optical feedback path comprising mirrors 54 and 56. The acoustic medium 50 is inclined at the Bragg angle in one plane for maximizing the optical scattering from the acoustic wave and at the Brewster angle in another plane to minimize the optical reflection loss at the air-acoustic medium interface.

The acoustic medium is shown in FIG. 7, and includes an acoustic absorber 58 connected to one side of the medium 50, and a transducer 60 connected to produce a perturbation within the medium 50 connected to the opposite side of the medium. An input signal of frequency $f$ is produced as previously described by a pulsing circuit, not shown.

If a pulsed RF or microwave signal of frequency $f$ is applied to the transducer 60, at a time T later an acoustical wave will intercept the optical feedback path of the laser. As illustrated, part of the optical wave of frequency $v_o$ traveling to the right in the laser cavity will be diffracted upward at a frequency $v_o+f$. Part of the optical wave of frequency $V_o$ traveling to the left in the laser cavity will be diffracted downward at a frequency of $v_o-f$.

A partial transmitting reflector 64 is positioned as illustrated to pass the output of the laser of frequency $v_0$. A mirror 62 is positioned as shown to reflect the secondary output from the laser $v_o+f$ to the reflecting side of mirror 64 where the signal $v_o+f$ is combined with the laser output $v_o$, and the composite signal is fed to a photodetector 66. The photodetector will superheterodyne the two optical frequencies and yield an electrical signal of frequency $f$ and thereby reproduce the electrical input signal which appeared at transducer 60. A similar arrangement may be made to superimpose the scattered light beam of frequency $v_o-f$ with $v_o$ to obtain similar results.

The variable delay may be obtained by moving the acoustic medium 50 of FIG. 6 into or out of the plane of the paper. The angle of the incident light beam from laser 52 with respect to the acoustic waves can be adjusted at the Bragg angle by rotating the axis of the acoustic delay medium 50 shown normal to the plane of the page with respect to a vertical axis in the plane of the paper. The acoustic medium 50 may also be positioned at the Brewster angle with respect to the incident light beam to minimize reflection losses. If the gain of the laser is sufficient, the Brewster angle positioning is not required.

Figure 8:
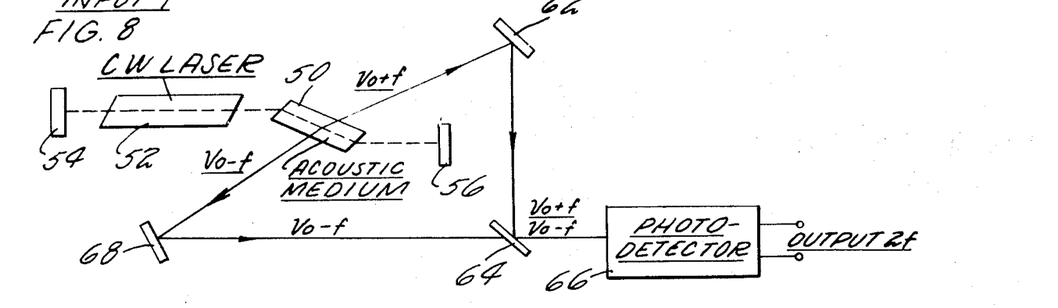
FIG. 8 shows schematically another laser delay line embodiment producing a frequency twice that of the acoustic input wave.

FIG. 8 illustrates an embodiment similar to FIG. 6 in which the wave fronts of both secondary diffracted light beams are made plane parallel and combined to impinge on the photodetector 66 whereby the input signal of frequency $f$ will be reproduced at a frequency of $2f$.

Referring to FIG. 8, a laser 52 is positioned in a cavity comprising reflectors 54 and 56. An acoustic medium 50 is positioned between the laser and reflector 56. As previously, a transducer is connected with the acoustic medium and generates an acoustical wave of frequency $f$ within the acoustic medium 50. The two secondary outputs, with frequencies $v_o+f$ and $v_o-f$ are reflected from mirrors 62 and 68 respectively and recombined at 50 percent transmitting reflector 64. The combined signals, i.e., a signal having frequencies of $v_o+f$ and $v_o-f$, are fed to photodetector 66 and superheterodyned therein to produce an output of twice the acoustic frequency. The output of the laser itself is not used in this embodiment.

Figure 9:
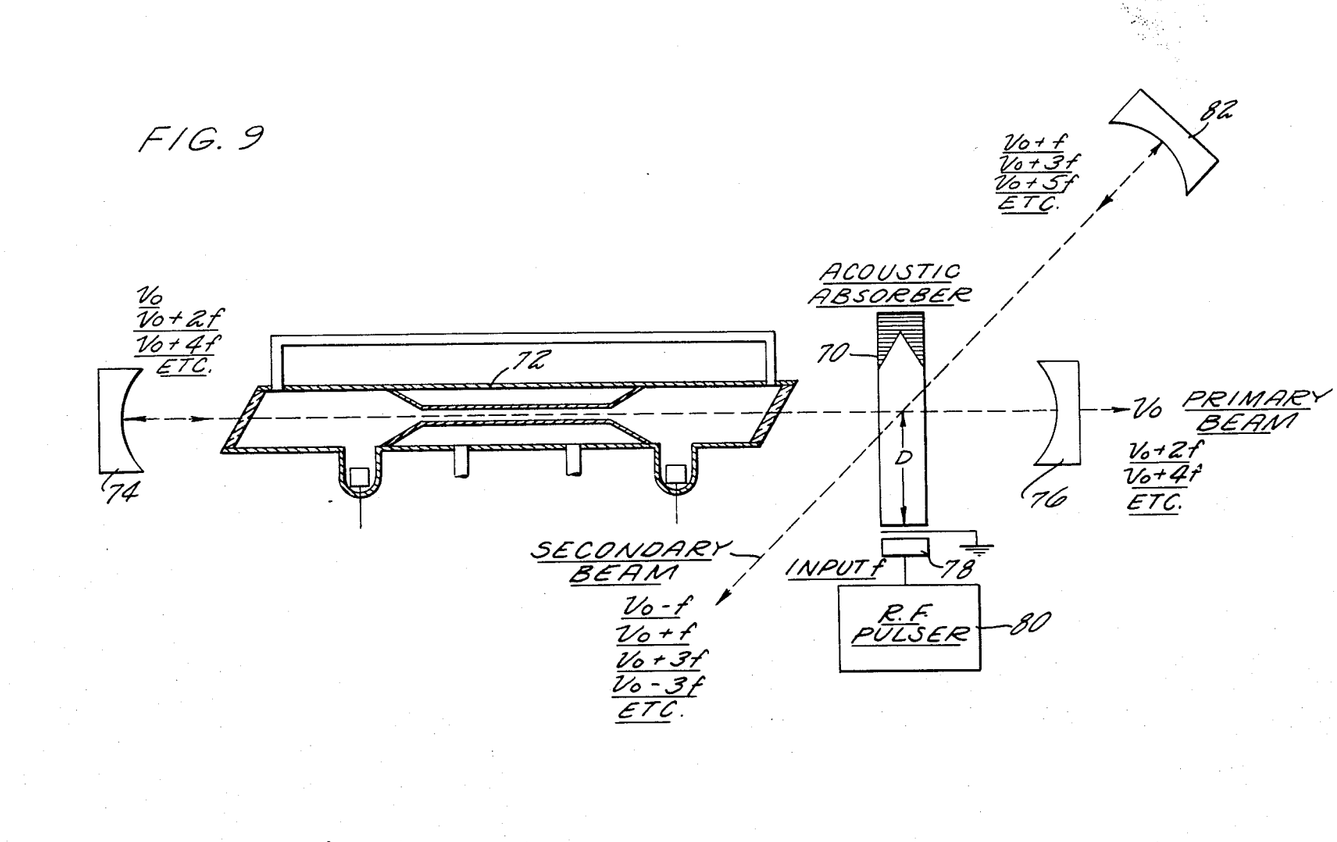
FIG. 9 shows another laser-acoustic variable delay line using traveling acoustic waves.

FIG. 9 shows another embodiment of a typical laser-acoustic variable delay line using traveling acoustic waves. The acoustic medium 70 is inserted into the optical feedback cavity of the laser 72. The cavity is formed by reflectors 74 and 76. The Brewster angle and Bragg angle arrangement is as previously described. A transducer 78 is connected with absorber 70 as previously described, and the transducer 78 is fed by RF pulser 80 with an input of frequency $f$. At a time $t$ after initiation of an acoustic wave in medium 70 equal to distance D divided by the velocity of the acoustic wave within the medium the acoustic wave will intersect the laser output, producing two secondary outputs of diffracted orders having frequencies $v_o+f$ and $v_o-f$. The former output is made to impinge onto a plane reflector 82 and reflected back through the acoustic traveling wave. Part of the $v_o+f$ beam is passed through the acoustic traveling wave undeflected while a fraction is again scattered and enters the laser-amplifying medium with a frequency $v_o+2f$. The $v_o+2f$ beam is amplified as it passes through the laser medium 72, and on the return pass to the acoustic wave, part is scattered again at a frequency $v_o\pm 3f$, etc. The output is detected by optically heterodyning either the primary or either of the two scattered secondary beams. The frequency upshifting and downshifting process repeats itself so that signals of 2, 4, 6 etc., times the acoustic frequency can be detected by optically beating the various frequency components. Additional multiple factors can be obtained by superheterodyning the lower diffracted order and the laser output beams. In addition, the lower diffracted order can also be fed back into the laser-amplifying medium, enabling all the various frequency components to be emitted in one direction.

Figure 10:
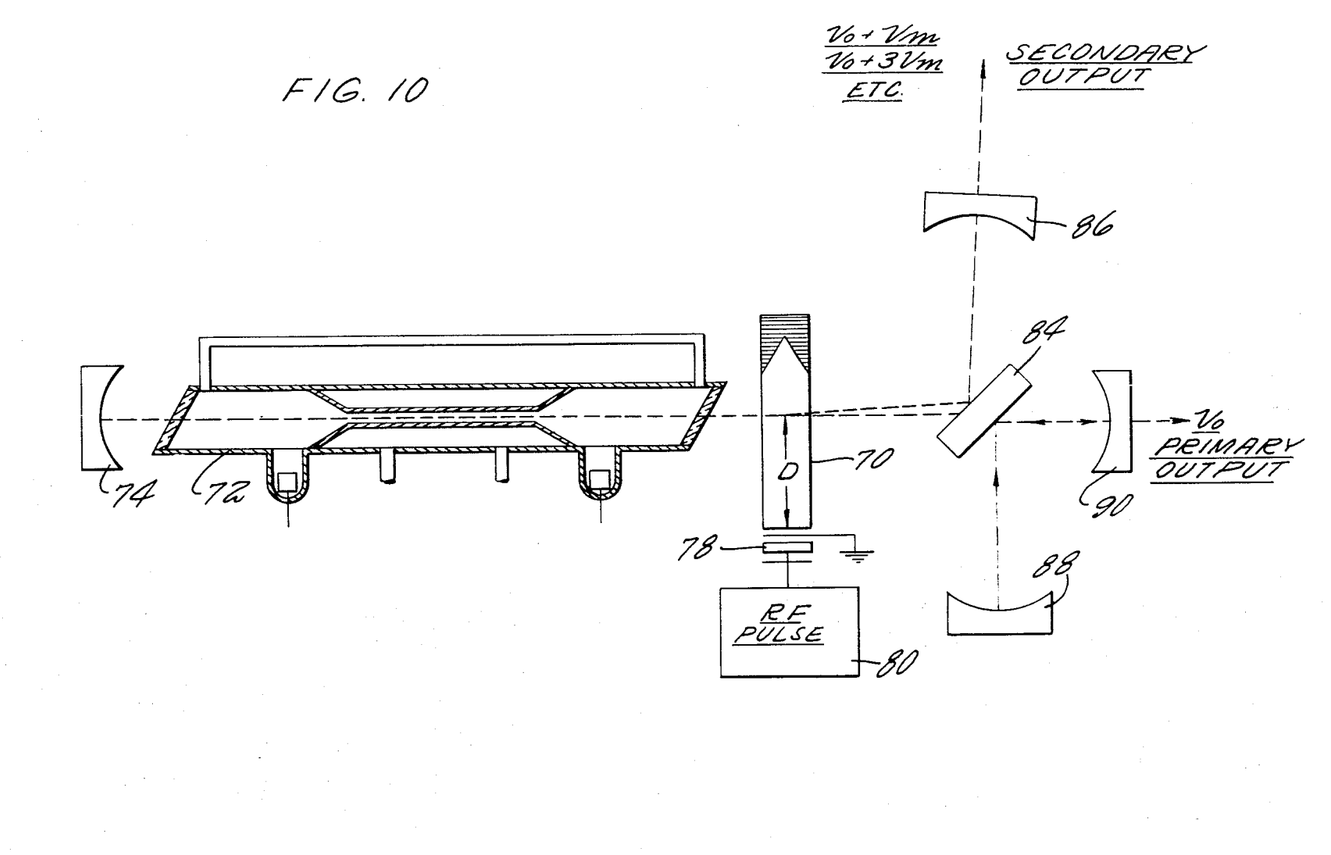
FIG. 10 shows an additional laser-acoustic delay line using traveling acoustic waves.

When the angle of the diffracted light is small, i.e., for low RF frequencies, the experimental arrangement of FIG. 9 will not be possible with convenient dimensions. For small angles and also for large angles, the arrangement of FIG. 10 may be employed to realize a variable delay with laser-acoustic interactions. In the arrangement of FIG. 10, a laser 72 is inserted in a feedback cavity comprising mirrors 74 and 90. An acoustic medium 70 with its associated transducer 78 actuated by pulser 80 is positioned in the laser feedback cavity as previously. Three highly reflecting mirrors 84, 90 and 88 form a resonant cavity whose properties are known to those skilled in the art. In this embodiment the optical feedback cavity consisting of mirrors 74, 84, 88 and 90 has the property that incident radiation at a resonant frequency of this cavity is allowed to pass back and forth between the reflectors 74 and 90, whereas the radiation scattered by the acoustic wave of frequency $f$ has a frequency shift equal to $f$ and is reflected out of the feedback cavity. This wave may now be heterodyned with the primary laser beam of frequency $v_o$ as previously described.

In addition the scattered beam may be reflected toward mirror 86. The purpose of the low-reflectivity mirror 86 is to reflect part of the scattered frequency shifted radiation of frequency $v_o\pm f$ back through the acoustic cell, reshifted in frequency to $v_o\pm 2f$, amplified through the laser back through the acoustic cell to again be scattered toward mirror 86 with a frequency $v_o\pm 3f$. Mirror 86 reflects the radiation back again to suffer additional frequency shifts. The detection of the optical beats resulting from the existence of the various frequencies in the secondary output beam from mirror 86 constitutes the output of the device.

While the preferred embodiments of this invention have been described in detail, it is obvious that it is merely by way of example, and that numerous changes and modifications may be made by those skilled in the art to the structure and position of the laser elements, mirrors, and associated equipment without departing from the scope of this invention as hereinafter claimed.

I claim:

1. A delay apparatus comprising means for generating a laser beam including a laser medium having a pair of end reflectors to form a feedback cavity, at least one of said reflectors being spaced from said laser medium, an acoustic transmitting medium positioned between said laser medium and said spaced reflector, means responsive to an alternating input signal for generating an acoustic wave within said acoustic medium, said acoustic wave propagating within said acoustic medium and intersecting said laser feedback radiation whereby said laser radiation is diffracted and produces at least one frequency shifted component together with an undiffracted component, a reflecting mirror positioned in the path of one of said frequency-shifted components for reflecting said frequency-shifted component back through said acoustic medium to reintersect said acoustic wave where said frequency-shifted component is further diffracted producing a further frequency-shifted component which is inserted into said feedback cavity, and means for producing from at least one of said frequency-shifted components an output signal having a frequency which contains any desired odd or even integral multiple of said alternating input signal frequency.

2. Apparatus as in claim 1 in which the said further frequency-shifted component is passed through one of said end reflectors to produce an output signal containing an even integral multiple of said alternating input signal frequency.

3. Apparatus as in claim 1 in which one of the said frequency-shifted components is passed through said reflecting mirror to produce an output signal containing an odd integral multiple of said alternating input signal frequency.

4. Apparatus as in claim 1 and including first and second mirrors positioned with respect to said spaced end reflector to form a resonant cavity, one of said first and second mirrors being partially transmitting and being positioned in the path of said laser feedback radiation, the undiffracted component of said feedback radiation at the resonant frequency of said resonant cavity being passed by said partially transmitting mirror into said resonant cavity and reflected back toward said laser medium, and the frequency-shifted component of said laser feedback radiation being reflected by said partially transmitting mirror out of said laser feedback cavity.

5. Apparatus as in claim 1 in which said laser feedback radiation intersects said acoustic wave at the Bragg angle.

6. Apparatus as in claim 1 in which said acoustic wave is a traveling wave.